(12) United States Patent
Ivie

(10) Patent No.: US 8,347,545 B2
(45) Date of Patent: Jan. 8, 2013

(54) DECOY SUPPORT SYSTEM AND METHOD

(76) Inventor: Rodney Ivie, Portageville, MO (US)

(*) Notice: Subject to any disclaimer, the term of this patent is extended or adjusted under 35 U.S.C. 154(b) by 465 days.

(21) Appl. No.: 12/759,376

(22) Filed: Apr. 13, 2010

(65) Prior Publication Data
US 2010/0287811 A1 Nov. 18, 2010

Related U.S. Application Data

(60) Provisional application No. 61/216,212, filed on May 13, 2009.

(51) Int. Cl.
*A01M 31/06* (2006.01)
(52) U.S. Cl. ..................................... 43/3; 43/2
(58) Field of Classification Search ............ 43/3, 2
See application file for complete search history.

(56) References Cited

U.S. PATENT DOCUMENTS

| | | | | |
|---|---|---|---|---|
| 282,851 A | * | 8/1883 | Danz | 43/3 |
| 843,588 A | * | 2/1907 | Ditto | 43/3 |
| 2,622,360 A | * | 12/1952 | Bertram | 43/3 |
| 5,144,764 A | * | 9/1992 | Peterson | 43/3 |
| 5,168,649 A | * | 12/1992 | Wright | 43/2 |
| 5,775,022 A | * | 7/1998 | Sumrall et al. | 43/3 |
| 6,408,559 B2 | * | 6/2002 | Mathews | 43/3 |
| 6,442,884 B1 | | 9/2002 | Sceery | |
| 6,708,440 B2 | * | 3/2004 | Summers et al. | 43/2 |
| 7,076,909 B2 | | 7/2006 | Heinn et al. | |
| 7,082,710 B1 | | 8/2006 | Jorgenson | |
| 7,137,221 B2 | | 11/2006 | Highby et al. | |
| 7,941,962 B2 | * | 5/2011 | Wood et al. | 43/3 |
| 2004/0025400 A1 | * | 2/2004 | Salato | 43/3 |
| 2006/0283071 A1 | * | 12/2006 | Haley | 43/3 |
| 2010/0115819 A1 | * | 5/2010 | Sieman | 43/3 |

* cited by examiner

Primary Examiner — Christopher P Ellis
(74) Attorney, Agent, or Firm — Thompson Coburn LLP

(57) ABSTRACT

A support supports a decoy device in an elevated position above the support with a post. The support comprises a platform member with a front edge and an opposite rear edge with longitudinal sides extending therebetween. The platform member has top and bottom surfaces defining parallel planes between the front and rear edges and the longitudinal sides. The front edge has a width dimension less than the width dimension of the rear edge. The front edge is generally pointed in cross-section. The platform member is formed from a material with sufficient buoyancy to allow the support to substantially float in the water with the decoy device mounted thereto. The platform member top surface has a mount adapted to receive the post of the decoy device. The platform member has a tether connector. The method of using the support is also disclosed.

20 Claims, 5 Drawing Sheets

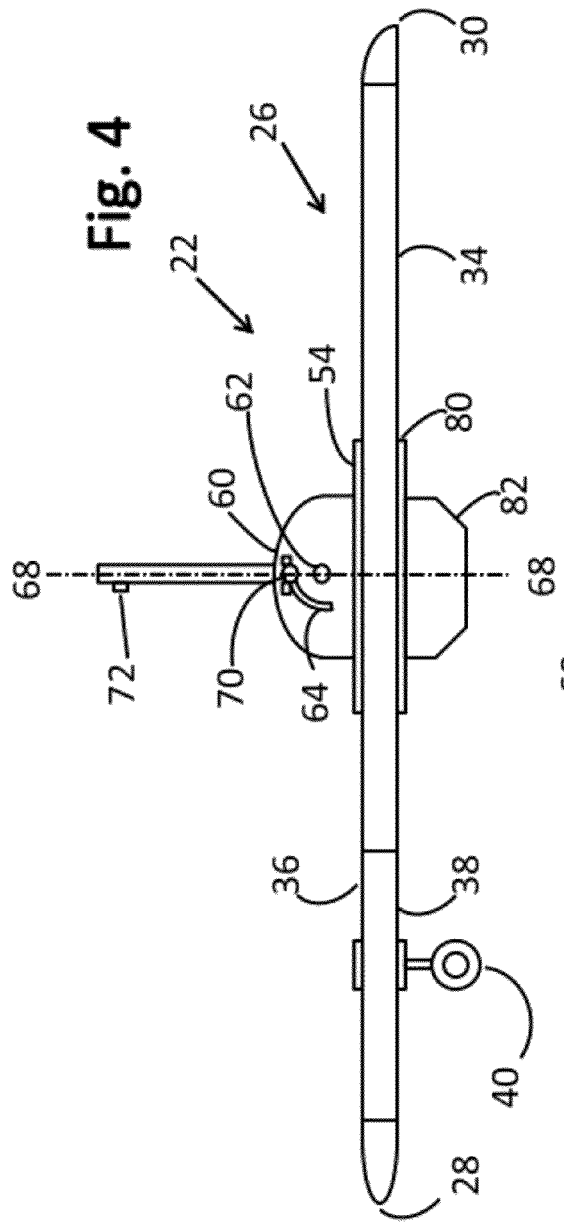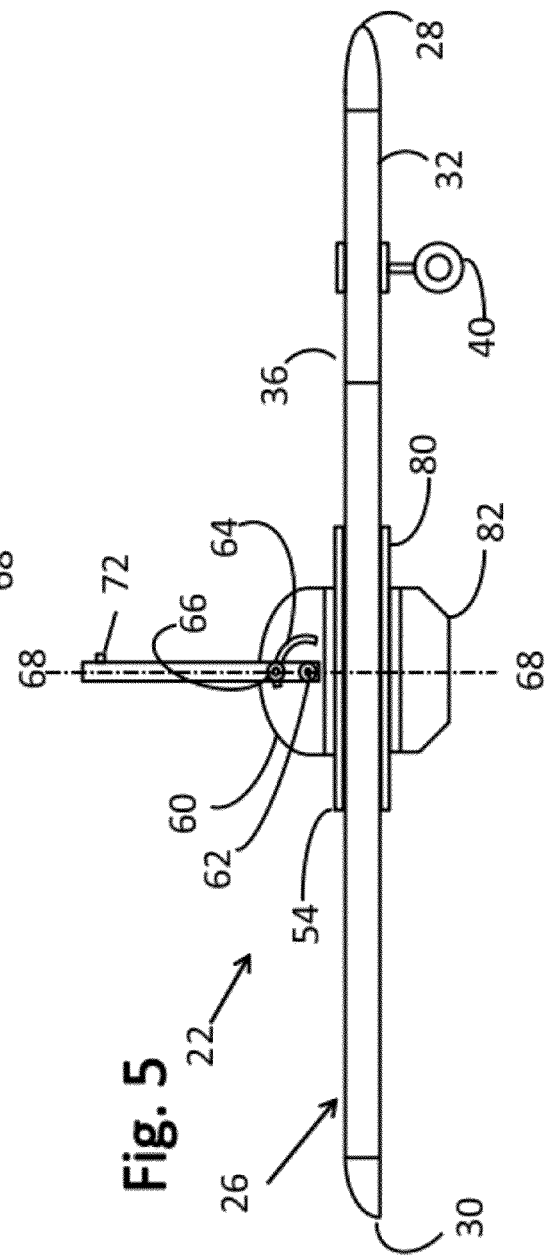

DECOY SUPPORT SYSTEM AND METHOD

CROSS-REFERENCE TO RELATED APPLICATIONS

This application claims the benefit of provisional application Ser. No. 61/216,212, filed on May 13, 2009, entitled "Duck Board."

BACKGROUND

This disclosure relates to a support system for a decoy and a method of using the same.

BRIEF DESCRIPTION OF THE DRAWINGS

FIG. 4 is a left side view of the support of FIG. 1.
FIG. 5 is a right side view of the support of FIG. 1.

DETAILED DESCRIPTION

Figure 1:
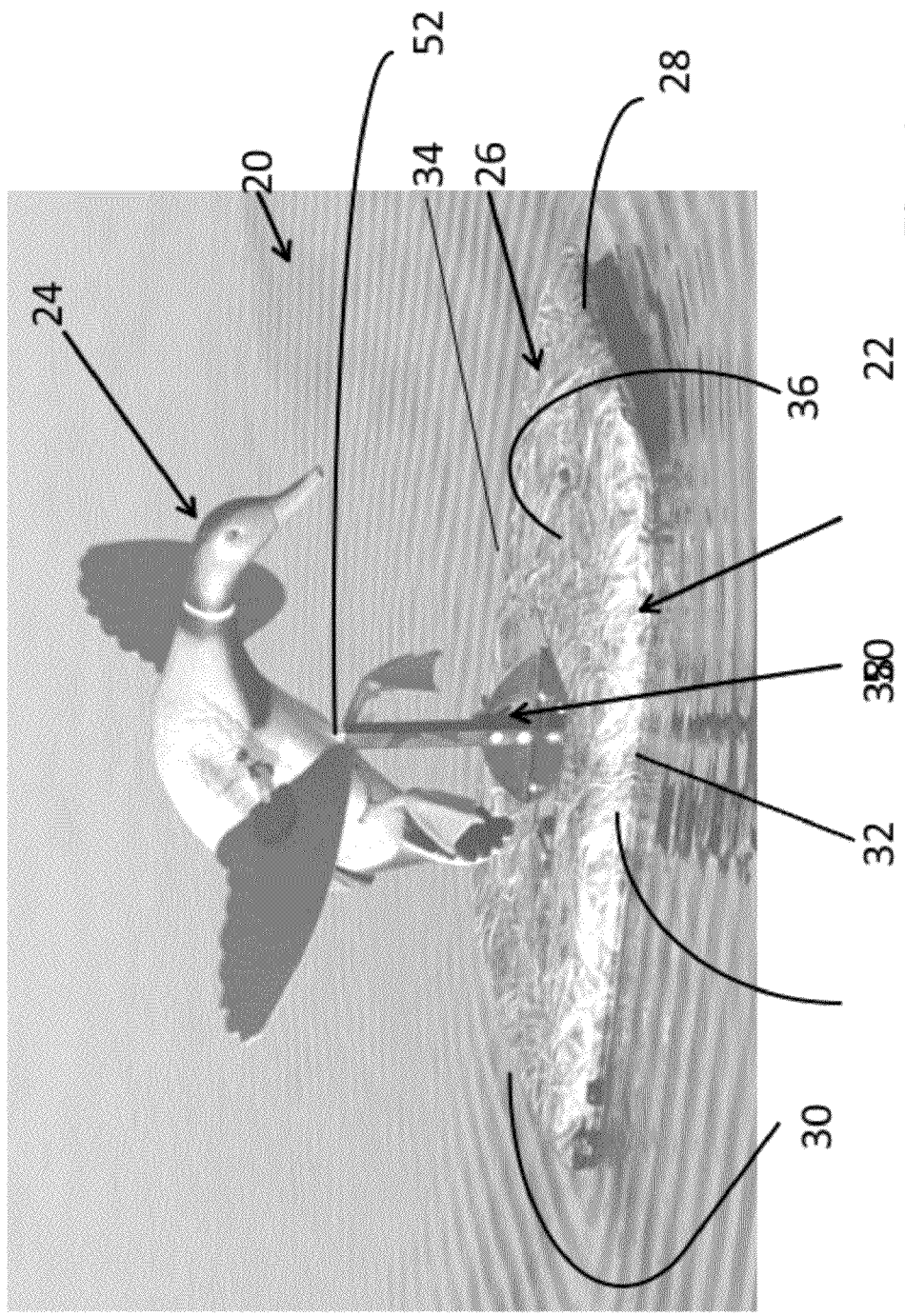
FIG. 1 is a perspective view of a support system with a decoy device mounted thereto in a deployed position floating in a lake.
Figure 2:
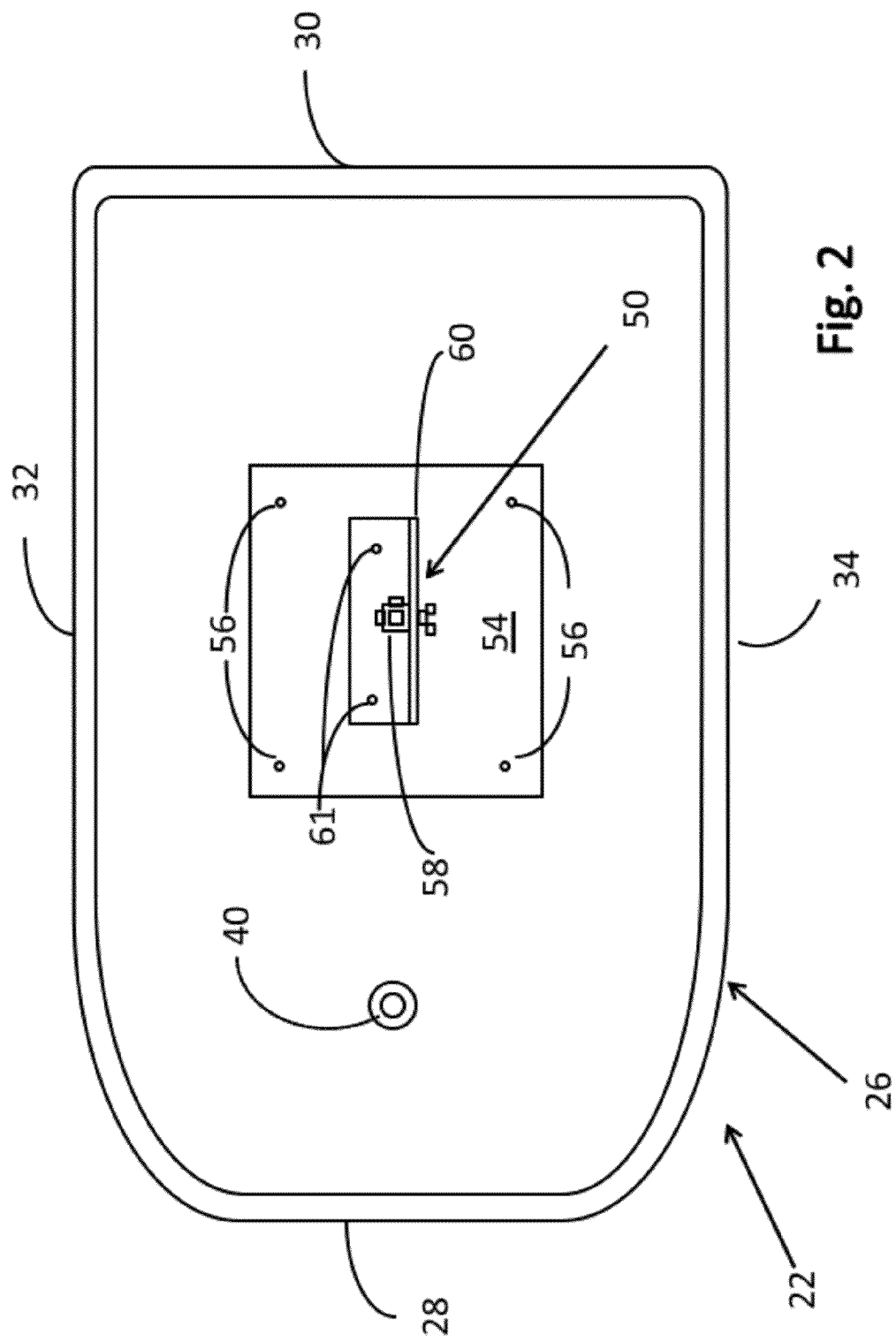
FIG. 2 is a top view of the support of FIG. 1.
Figure 3:
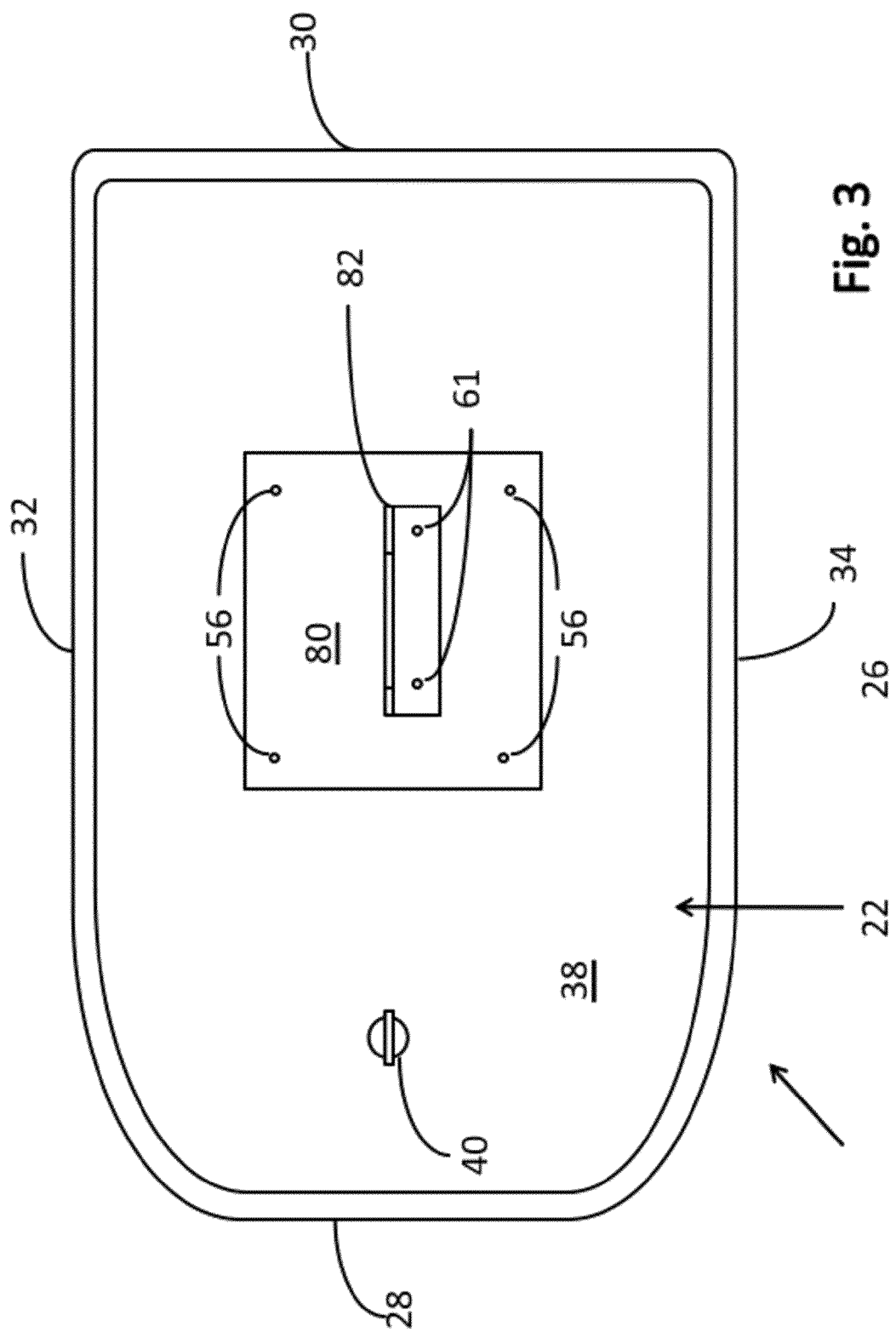
FIG. 3 is a bottom view of the support of FIG. 1.
Figure 6:
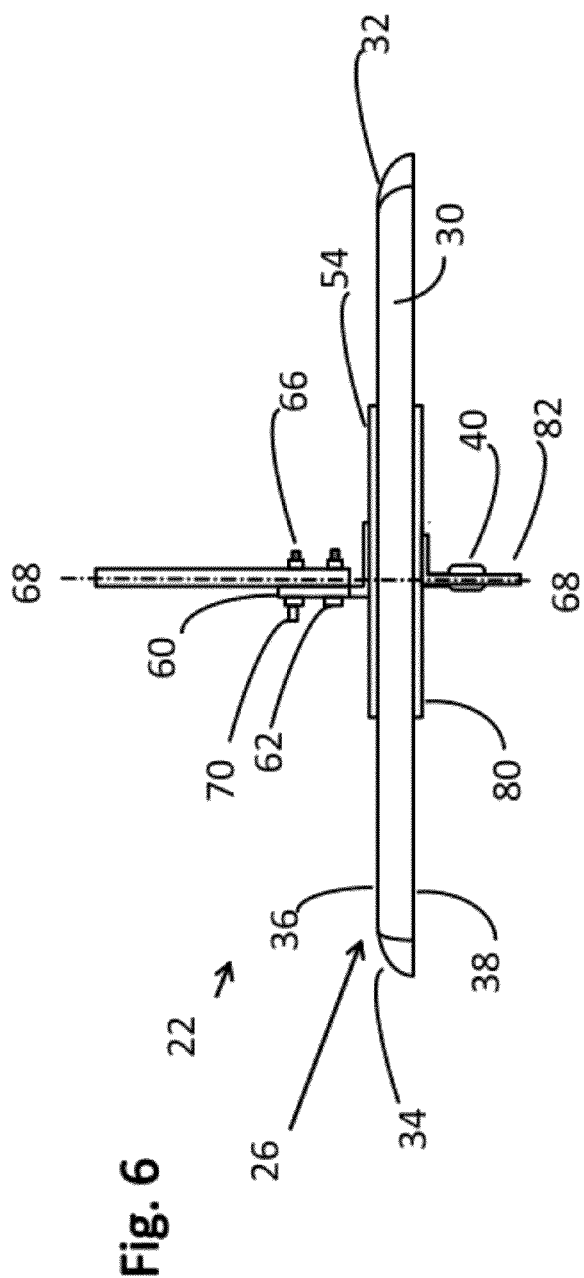
FIG. 6 is a rear view of the support of FIG. 1.
Figure 7:
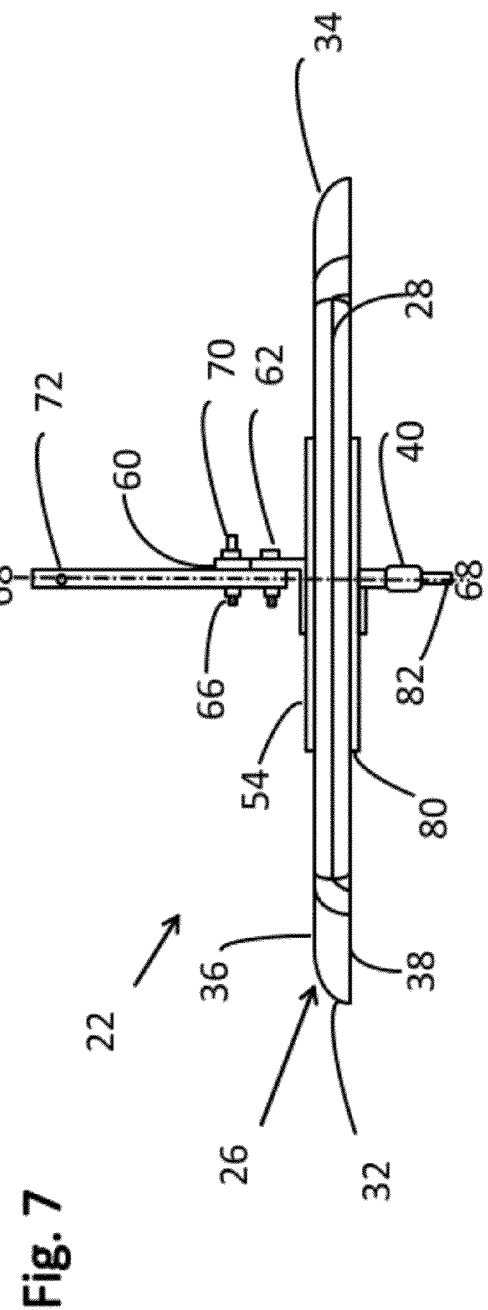
FIG. 7 is a front view of the support of FIG. 1.

FIG. 1 shows a decoy assembly 20 comprising a support 22 and decoy device 24. The support 22 comprises a platform member 26 having a front edge 28, and an opposite rear edge 30 with longitudinal sides 32, 34 extending therebetween. The platform member 26 has a top surface 36 and opposite bottom surface 38 that define parallel planes between the front and rear edges 28, 30 and the opposite longitudinal sides 32, 34. The front edge 28 has a width dimension less than the width dimension of the rear edge 30. Preferably, the platform measures thirty-one (31") inches along its longitudinal sides 32, 34 and eighteen and one-half (18½') inches across its rear edge 30. The front edge 28 may have a dimension of ten (10") inches. Preferably, the front edge is generally pointed in cross-section. For instance, the coterminous edge of the front edge and the top surface is tapered toward a midsection of the platform, and the coterminous edge of the front edge and bottom surface is tapered toward a midsection of the platform to form a generally tapered front edge. The coterminous edge of the top surface and longitudinal sides may be beveled, and the coterminous edge of the rear edge and the top surface may be beveled. The platform member is preferably made from a material with sufficient buoyancy to allow the support to substantially float in water with the decoy device mounted thereto. The platform member may be made from plastic, cork, or wood. Most preferably, the platform member is made from a foam material. As shown in FIG. 1, the platform member may be adorned with camouflage scheme to increase its effectiveness as a decoy.

The platform member 26 may also have a tether connector 40. Preferably, the tether connector is provided on the bottom surface 38 of the platform, although the tether connector may be reversible and/or provided on the top surface. Preferably, the tether connector comprises an eyelet to receive a tether, which may comprises an anchor line or a tow line, as will be described in greater detail below.

The platform member may also be provided with a mount 50 adapted to receive a post 52 of the decoy device 24. As shown in FIG. 1, the decoy device 24 may comprise a "spinning wing"-type decoy device that is elevated with a post. However, a decoy device with another configuration may also be used with the support by elevating the decoy device above the support with a post. FIGS. 2-7 provide additional detail of the platform mount 50. The mount may comprise a top plate 54 mounted to the top surface 36 in the general center of the platform. The top plate 54 may be secured to the platform with mechanical fasteners 56, or in the alternative may be molded into the platform. The platform member mount may further comprise a receptacle 58 adapted to receive the decoy device post. Preferably, the receptacle 58 comprises a tube. The decoy device post may fit in an interior of the tube and/or may fit around an exterior surface of the tube. Preferably, the tube receptacle 58 is seven (7") inches long. The tube may be square or circular. Preferably, the tube receptacle is formed from a ¾ inch×¾ inch square, 16 gauge hot rolled steel tube. The tube receptacle 58 accepts a longer portion of the decoy device post and thereby provides a more rigid mount for the decoy device. Alternatively, the receptacle may comprise a hole in the platform member of a dimension sufficient to receive the device decoy post (i.e., a hole in the top plate, a hole through the platform member, or a hole molded as a recess in the top surface of the platform).

Preferably, the tube receptacle 58 is pivotable relative to the top surface 36 of the platform. For instance, the mount 52 may further comprise a top fin member 60 to pivotably secure the tube receptacle 58 to the platform mount 50. The top fin member 60 may be mounted to the top plate 54 with mechanical fasteners 61. As shown in the drawings, a proximal end of the tube may be secured to the top fin member 60 with a pivot connection 62 and the top fin member may be provided with an arcuate guide 64 that accepts a guide pin 66 of the tube. The tube receptacle 58 may pivot between a generally upright position in which a centerline 68 of the tube receptacle is perpendicular to the platform top surface 36 and a lowered position in which the center line of the tube is generally parallel to the platform top surface. By configuring the tube receptacle to pivot relative to the platform member top surface, the tube receptacle may pivot from an upright position to a lowered position to provide a compact configuration for storage of the support. A wing-nut or other locking nut 70 may be used to secure the tube receptacle to the top fin member in an upright or lowered position as desired. A set screw 72 may also be provided in the tube receptacle to secure the decoy device post to the tube receptacle.

A bottom plate 80 may also be installed on the bottom surface 38 of the platform 26. The bottom plate 80 may provide additional support for the mount 50. For instance, the top plate 54 and the bottom plate 80 may be aligned and secured together with the mechanical fasteners 56 that are directed through co-linearly aligned holes in the top and bottom plates, and platform member 26. Alternatively, each of the plates may be secured to the platform separately, or alternatively, the bottom plate may be molded into the platform.

To provide additional stability for the support, a bottom fin 82 may be provided on the bottom surface 38. Preferably, the bottom fin 82 is mounted to the bottom plate 80. More preferably, the top fin member 60 and the bottom fin 82 may be secured together through the top and bottom plates 54, 80 and the platform member 26 by directing the mechanical fasteners 61 through co-linearly aligned holes in the top and bottom fins and the top and bottom plates. Preferably, the bottom fin projects 82 outward from the bottom surface in a plane that is co-linearly aligned with the center line 68 of the tube receptacle in the upright position to increase the stability of the support with a decoy mounted thereto. For a support measuring approximately eighteen and one-half (18½") inches by thirty-one (31") inches, the fin may be approximately seven (7") inches by three (3") inches. In an alternative design, the bottom fin may be seven (7") inches by two (2") inches. Although one bottom fin is shown in the drawings, multiple bottom fins may be mounted to the bottom surface of the platform member to increase stability. Although the bottom fin is shown rigidly mounted to the bottom surface, the fin may be movable between a stowed position in which the fin is generally flush against the bottom surface and a deployed position in which the fin projects outward from the bottom surface.

When the support and decoy device are deployed, a decoy device may be mounted in the receptacle in a manner to elevate the decoy device above the platform member top surface. The support with decoy device mounted thereto may be deployed by floating the support in water as desired. A tether may be connected to the tether connector 40. The tether may be connected to an anchor with a length of the tether determined by water depth. In this way, the support with decoy device mounted thereto may form a static decoy in a body of water. Alternatively, the tether may be pulled by reeling or towing. For instance, deploying the decoy may include towing the tether across a body of water so that the support with decoy device mounted thereto moves across a body of water with another moving body, i.e., a boat. Alternatively, deploying the decoy may include pulling the tether by reeling so that the support with decoy device mounted thereto moves across a body of water to a stationary point. For storage, the decoy device may be removed from the tube receptacle by loosening the set screw, and the tube receptacle may be pivoted to the lowered position by loosening the locking nut. When installing the decoy device, preferably, the tube receptacle is pivoted to the upright position and locked in place with the locking nut, and the decoy device post is inserted into the tube receptacle and secured in place with the set screw. It should be appreciated that the decoy device may be mounted to the mount with the tube receptacle in another position.

As various modifications could be made in the constructions and methods described herein and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A support for supporting a decoy device, the decoy device being deployable in an elevated position above the support with a post, the support comprising a platform member having a front edge and an opposite rear edge with longitudinal sides extending therebetween, the platform member having a top and bottom surfaces defining parallel planes between the front and rear edges and the longitudinal sides, the front edge having a width dimension less than a width dimension of the rear edge, the front edge being generally pointed in cross-section, the platform member being formed from a material with sufficient buoyancy to allow the support to substantially float in water with the decoy device mounted thereto, the platform member top surface having a mount adapted to receive the post of the decoy device, the platform member having a tether connector.

2. The support of claim 1 wherein the platform member mount comprises a receptacle adapted to receive the decoy device post.

3. The support of claim 1 wherein the receptacle of the platform member mount comprises a tube.

4. The support of claim 3 wherein the tube pivots relative to the platform member top surface.

5. The support of claim 4 wherein the tube is pivotable between a generally upright position in which a centerline of the tube extends generally perpendicular to the plane defined by the platform member top surface and a down position in which the center line of the tube is generally parallel with the plane defined by the platform member top surface.

6. The support of claim 3, wherein the tube interior is dimensioned to receive the decoy device post.

7. The support of claim 1, wherein the tether connector is connectable to an anchor.

8. The support of claim 1 wherein the platform member bottom surface has at least one stability fin.

9. A method comprising:
   accessing a decoy device comprising a decoy adapted to be deployed in an elevated position with a post;
   accessing a support comprising a platform member having a front edge and an opposite rear edge with longitudinal sides extending therebetween, the platform member having a top and bottom surfaces defining parallel planes between the front and rear edges and the longitudinal sides, the front edge having a width dimension less than a width dimension of the rear edge, the front edge being generally pointed in cross-section, the platform member being formed from a material with sufficient buoyancy to allow the support to substantially float in water with the spinning decoy device mounted thereto, the platform member top surface having a mount adapted to receive the post of the decoy device, the platform member having a tether connector;
   mounting the decoy device to the support at the platform member mount;
   connecting a tether to the tether connector; and
   deploying the decoy device and the support with the decoy device elevated above the platform member top surface.

10. The method of claim 9, wherein the platform member mount comprises a receptacle sized to receive the decoy device post.

11. The method of claim 10, wherein the step of mounting the decoy device to the support includes placing the decoy device post in the receptacle.

12. The method of claim 9, wherein the platform member mount comprises a tube sized to receive the decoy device post.

13. The method of claim 12 wherein the tube pivotable relative to the member top surface.

14. The method of claim 13 further comprising pivoting the tube to a generally upright position in which a centerline of the tube extends generally perpendicular to the plane defined by the platform member top surface.

15. The method of claim 12 wherein the step of mounting the decoy device to the support further includes inserting the decoy device post in the interior of the tube.

16. The method of claim 9, wherein the step of connecting a tether to the tether connector includes connecting an anchor to the tether.

17. The method of claim 9, further comprising pulling the decoy device and support via the tether connected to the tether connector.

18. The method of claim 9, wherein the step of deploying the decoy device and support includes configuring at least one stability fin to project outward from the platform member bottom surface.

19. A method comprising:

accessing a decoy device adapted to be deployed in an elevated position with a post;

accessing a support comprising a platform member having a front edge and an opposite rear edge with longitudinal sides extending therebetween, the platform member having a top and bottom surfaces defining parallel planes between the front and rear edges and the sides, the front edge having a width dimension less than the width dimension of the rear edge, the front edge being generally pointed in cross-section, the platform member being formed from a material with sufficient buoyancy to allow the support to substantially float in water, the platform member top surface having a mount adapted to receiving the post of the spinning decoy device, the mount being pivotally connected to the platform member top surface;

mounting the decoy device to the support; and elevating the decoy device above the platform member top surface by pivoting the mount to a generally upright position such that the decoy device post extends generally perpendicular to the plane defined by the platform member top surface.

20. The method of claim 19 further comprising lowering the decoy device by pivoting the mount to a position in which the decoy device post is generally parallel with the plane defined by the platform member top surface.

* * * * *